Nov. 11, 1969  R. ALTON  3,477,773

MOLDED CAGE FOR NONSEPARABLE ASSEMBLY OF ROLLER BEARINGS

Filed Jan. 23, 1968

INVENTOR
Ralph Altson, deceased,
BY John A. Altson, &
George R. Altson,
BY his legal representatives,
F. J. Fodale
ATTORNEY

United States Patent Office 3,477,773
Patented Nov. 11, 1969

3,477,773
MOLDED CAGE FOR NONSEPARABLE ASSEMBLY OF ROLLER BEARINGS
Ralph Altson, deceased, late of Sandusky, Ohio, by John A. Altson, Port Jefferson, and George R. Altson, Rochester, N.Y., administrators, assignors to General Motors Corporation, Detroit, Mich., a corporation of Delaware
Filed Jan. 23, 1968, Ser. No. 699,877
Int. Cl. F16c 33/00
U.S. Cl. 308—214                5 Claims

ABSTRACT OF THE DISCLOSURE

A tapered roller bearing having a nonshouldered outer race, an inner race with a shoulder at its large diameter end and a single-piece molded cage which has radial projections on its small diameter end ring which cooperate with the outer race and radial projections on its large end ring which cooperate with the shoulder on the inner race to provide a unit-handled assembly. The cage may be modified by removing either of the projections and incorporating suitable roller retainment to provide a unit-handled assembly of the cage, rollers, and one race.

---

This invention relates generally to tapered roller bearings and more specifically, to a tapered roller bearing having certain unit-handled relationships provided by a one-piece molded cage.

Today's conventional tapered roller bearings consist of a double-shouldered inner race, a sheet metal "over-center" cage and a complement of rollers which are assembled by the well known "bump" method as illustrated in the U.S. Patent 1,444,326 to Buckwalter. In the "bump" method, the cage cross bars are first deformed allowing the rollers to pass over the small diameter shoulder and then straightened to provide the assembly. An unshouldered outer race is normally provided as a separate piece.

Many proposals have been made to modify this conventional structure to eliminate one shoulder of the inner race. These modifications most often manifest themselves in "bend-over tabs" on various parts of the cage to either secure it to the race or to provide roller retainment or both. In some instances, modifications have been made to include the outer race in the unit-handled assembly. However, while many alternate constructions have been proposed, the conventional construction still enjoys the dominant position because of its economical method of manufacture.

Accordingly, this invention is broadly directed to providing a tapered roller bearing of economical manufacture which is an improvement over the conventional design and yet retains all of its desirable features. One of the improvements resides in the fact that one shoulder has been eliminated from the inner race while the bearing is still capable of being supplied with one race, the cage, and the rollers in unit-handled relationship. Elimination of the shoulder affords easy access to the roller pathway for grinding and finishing. Another improvement resides in the fact that no tabs or other "bend-over" or deformable portions are required. Elimination of any permanent deformation of the cage negates the introduction of stresses and other weakening characteristics to the cage. Another feature of improvement resides in the fact that the end rings of the cage are maintained unbroken to help maintain its structural integrity. Also, the bearing is easily modified to incorporate the outer or second race into the unit-handled assembly.

Figure 1:
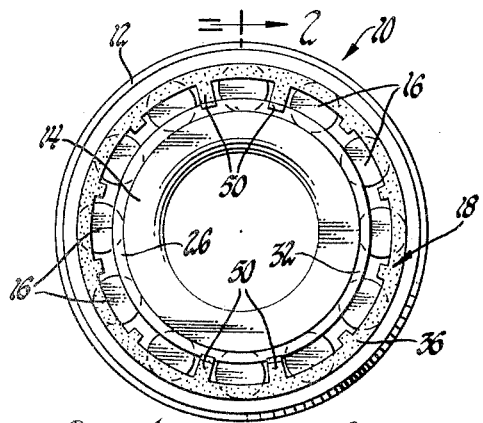
Figure 2:
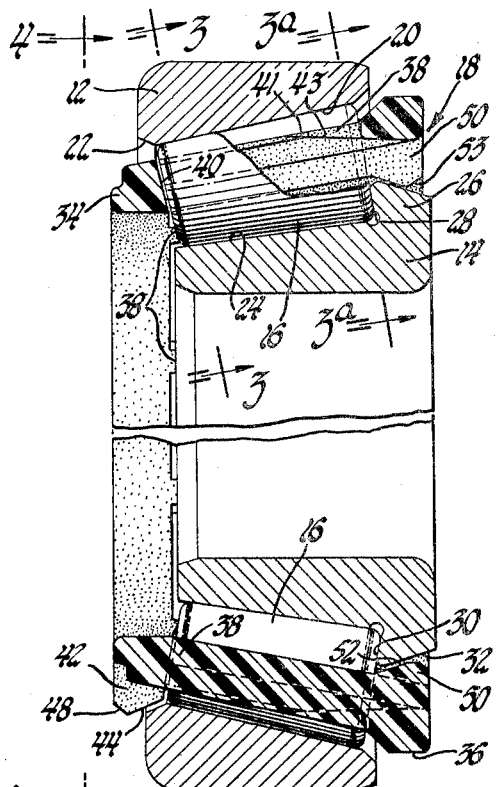
Figure 3:
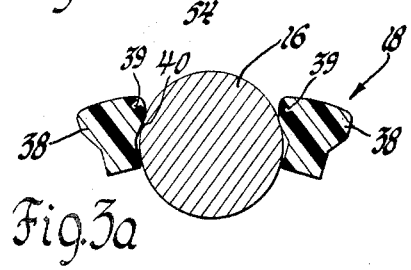
Figure 3A:
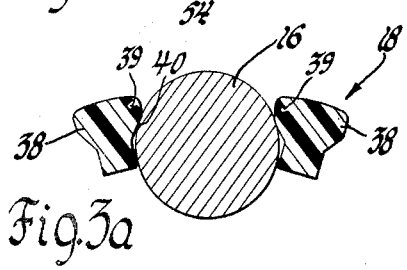
Figure 4:
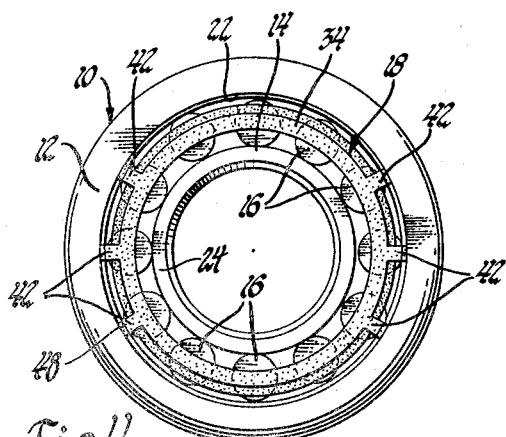
Figure 5:
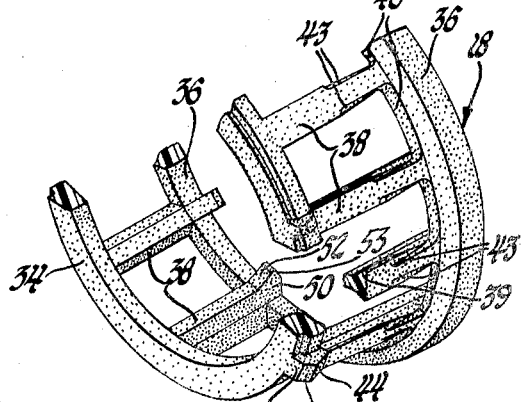

The exact nature of this invention as well as other objects and advantages thereof will be readily apparent from consideration of the following specification relating to the annexed drawing in which:

FIGURE 1 is an elevation view taken along the axis of a tapered roller bearing from the large diameter end.
FIGURE 2 is an enlarged view taken along the line 2—2 of FIGURE 1.
FIGURE 3 is a view taken along the line 3—3 of FIGURE 2.
FIGURE 3a is a view taken along the line 3a—3a of FIGURE 2.
FIGURE 4 is a view taken along the line 4—4 of FIGURE 2.
FIGURE 5 is a perspective view of a portion of the cage.

Referring now more particularly to FIGURE 2, the tapered roller bearing indicated generally at 10 comprises an outer race 12 and an inner race 14 with a complement of tapered rollers 16 disposed between the races 12 and 14 and circumferentially spaced by a cage 18.

The outer race 12 has no shoulders. Its inner circumferential surface includes a tapered pathway 20, the smaller diameter of which is contiguous with a frusto-conical surface 22 which has a taper opposite to that of the pathway 20. The inner race 14 includes a tapered pathway 24 on its outer circumference. The large diameter end of the inner race 14 includes a shoulder 26. A circumferential undercut 28 is provided at the juncture of the radial face 30 of the shoulder 26 with the pathway 24 to facilitate grinding of raceway and shoulder. The outer circumferential surface 32 tapers oppositely to the taper of the pathway 24.

The cage 18 comprises a small diameter end ring 34 and a large diameter end ring 36 connected by a number of integral cross bars 38 which form windows 40 which individually receive the rollers 16 (as best shown in FIGURE 5). Extending radially outward from the end ring 34 are a number of lugs 42. The lugs 42 include ramped surfaces 44 which are preferably substantially parallel to the frusto-conical surface 22 on the outer race 12. The outboard faces 48 on the lugs 42 are tapered so as to be cammed by pathway 20.

A second set of lugs or projections 50 extend radially inwardly from the end ring 36. The lugs 50 are shown as being in alignment with the cross bars 38 and include a ramped surface 52 which is substantially parallel to the frusto-conical surface 32 on the inner race shoulder 26. The outboard faces 53 on the lugs 50 are tapered so as to be cammed by shoulder 26. The number and spacing of the lugs 50 will vary with different designs, however, I have found that four lugs placed in diametrically opposed pairs as shown in FIGURE 1 works well.

Referring now to FIGURES 3 and 3a, the cross section of the cage bars 38 is shown. Each cage bar flares outwardly at its radially outward portions into projections 39 which narrow the circumferential width of the window 40 and provide retaining surfaces for the rollers 16. The projections 39 at the small diameter end are much more pronounced than at the large diameter end as can be seen by comparison of FIGURES 3 and 3a. At a point 41 midway on the cross bar 39, the projections taper into the cross bar toward the large diameter end. This is best seen in FIGURE 5. In addition, the top surface of the cross bar 38 is narrowed producing cylindrical surfaces 43 on the same cylindrical plane as the inner circumference of the end ring 36. The circumferential width 54 of the window 40 adjacent the radially inward end of the cage likewise is slightly smaller than the diameter of the roller 16 so that the cage 18 provides two-way roller retention. Two-way retention is desirable but not necessary. The critical relationship occurs when only one race is to be included in a unit-handled assembly. In such a case, retention of the rollers away from the one race must be provided.

The bearing may be assembled in the following manner. Starting with the cage 18, the rollers 16 are first snapped into the windows 40 from the inside of the cage providing a unit-handled assembly of cage and rollers. Next, and in reference to FIGURE 2, the cage and rollers are slid axially onto the inner race 14 from the smaller diameter end. In this movement, the cage being resilient, the end ring 36 will elastically deform allowing the lugs 50 to pass over the shoulder 26. Note that the tapered faces 53 aid in camming the lugs over the shoulder 26. In the particular embodiment illustrated with the four lugs positioned as they are shown, the end ring 36 deforms into an elliptical shape. At this point, there is provided a unit-handled assembly of cage, rollers and inner face since the taper of the pathway 24 limits relative axial movement toward the right as viewed in FIGURE 2 and since the ramp surfaces 52 on the lugs 50 cooperate with the frusto-conical surface 32 to limit relative axial movement toward the left as viewed in FIGURE 2.

The outer race 12 is then assembled to the cage, rollers, and inner race by sliding it axially from the smaller diameter end of the rollers. In this last movement, the cage being resilient yields and allows the outer race to pass over the lugs 42. Once in position, the outer race 12 is limited in further axial movement toward the right by the taper of the rollers 16. Relative axial movement toward the left is limited by the cooperation between ramps 44 on the lugs 42 and the frusto-conical surface 22.

In some instances, it may be desirable to provide a unit-handled assembly of the rollers, cage and one race ring with the other race ring being included as a separate piece in a common package. For instance, should the outer race ring 12 be the separate piece, the rollers, cage and inner race would be assembled as before, however, in such a case, the lugs 42 need not be included with the cage 18. Similarly, while it is preferable to provide two-way retention for the rollers 16 in the cage 18, it is only absolutely necessary to provide retention in the radially outward direction.

On the other hand, if the rollers, cage and outer race are to be provided in a unit-handled assembly with the inner race being provided as a separate piece in a common package, the structure and procedure can be modified by eliminating the lugs 50 and the outwardly flared portions on the cross bars 38.

I claim:
1. A tapered roller bearing comprising in combination,
an inner race having a first tapered pathway and a thrust shoulder at its large diameter end, said thrust shoulder having a first frusto-conical surface tapered oppositely to said pathway,
an outer race having a second tapered pathway, and a second frusto-conical surface tapered oppositely to said second pathway,
a complement of tapered rollers disposed between and in frictional engagement with said pathways,
a cage for circumferentially spacing said rollers, said cage being of a one-piece, molded construction and having a large diameter end ring overlying said first frusto-conical surface and a small diameter end ring with cross bars extending therebetween to form windows adapted to individually receive said rollers, the width of said windows adjacent the radially outer portion of said cross bars being less than the roller diameter, and the width of said windows adjacent the radially inner portion of said cross bars being less than the roller diameter whereby said rollers are snap-retained in said windows,
a first set of circumferentially spaced lugs depending from said larger diameter end ring, said first set of lugs having a surface which cooperates with said first frusto-conical surface to limit the axial movement of said inner race away from said rollers, and
a second set of circumferentially spaced lugs extending from said smaller diameter end ring, said second set of lugs having a surface which cooperates with said second frusto-conical surface to limit the axial movement of said outer race away from said rollers whereby a unit-handled tapered roller bearing is provided.

2. A tapered roller bearing comprising in combination,
an inner race having a first tapered pathway,
a first frusto-conical surface on said inner race tapered oppositely to said pathway,
an outer race having a second tapered pathway, and a second frusto-conical surface tapered oppositely to said second pathway,
a complement of tapered rollers disposed between and in frictional engagement with said pathways,
a cage for circumferentially spacing said rollers, said cage being of a one-piece, molded construction and having a large diameter end ring overlying said first frusto-conical surface and a small diameter end ring with cross bars extending therebetween to form windows adapted to individually receive said rollers,
a first set of circumferentially spaced lugs depending from said larger diameter end ring, said first set of lugs having a surface which cooperates with said first frusto-conical surface to limit the axial movement of said inner race away from said rollers, and
a second set of circumferentially spaced lugs extending from said smaller diameter end ring, said second set of lugs having a surface which cooperates with said second frusto-conical surface to limit the axial movement of said outer race away from said rollers whereby a unit-handled tapered roller bearing is provided.

3. The combination comprising,
a race having a tapered pathway,
a frusto-conical surface on said race tapered oppositely to said pathway,
a complement of tapered rollers disposed about said pathway, and
a cage for circumferentially spacing said rollers, said cage being of a one-piece, resilient construction and having a first end ring overlying said frusto-conical surface and a second end ring with cross bars extending therebetween to form windows adapted to individually receive said rollers,
means protruding into said windows to prevent radial movement of said rollers away from said pathway,
a plurality of circumferentially spaced lugs depending from said first end ring, said lugs having a tapered surface which cooperates with said frusto-conical surface to limit the axial movement of said race away from said rollers whereby said cage and rollers are adapted to be assembled into unit-handled relationship with said race by axially moving said rollers and cage toward said frusto-conical surface until said lugs are snapped over said surface.

4. The combination comprising,
an inner race having a tapered pathway and a shoulder at its large diameter end,
a frusto-conical surface on said shoulder tapered oppositely to said pathway,
a complement of tapered rollers disposed about said pathway, and
a cage for circumferentially spacing said rollers, said cage being of a one-piece, molded construction and having a large diameter end ring overlying said frusto-conical surface and a small diameter end ring with cross bars extending therebetween to form windows adapted to individually receive said rollers,
means adjacent the outer surface of said cross bars protruding into said windows to limit radial outward movement of said rollers,
a plurality of circumferentially spaced lugs depending from said large diameter end ring, said lugs having a surface which cooperates with said frusto-conical surface to limit the axial movement of said race away from said rollers whereby a unit-handled assembly of inner race, cage and rollers is provided.

5. The combination comprising, an outer race having a tapered pathway, a first frusto-conical surface on said outer race tapered oppositely to said pathway, a complement of tapered rollers disposed about said pathway and a cage for circumferentially spacing said rollers, said cage being of a one-piece, molded construction and having a small diameter end ring overlying said frusto-conical surface and a large diameter end ring with cross bars extending therebetween to form windows adapted to individually receive said rollers, means protruding into said windows to limit radially inward movement of said rollers, a plurality of circumferentially spaced lugs extending from said small diameter end ring, said lugs having a surface which cooperates with said frusto-conical surface to axially limit the axial movement of said outer race away from said rollers whereby a unit-handle assembly of race, cage and rollers is provided.

References Cited

UNITED STATES PATENTS 2,435,839   2/1948   McNicoll _____ 308—214

MARTIN P. SCHWADRON, Primary Examiner

FRANK SUSKO, Assistant Examiner